No. 657,851. Patented Sept. 11, 1900.
T. H. BOYER.
FILTER.
(Application filed Mar. 30, 1900.)
(No Model.)

Witnesses:
E. E. Duffy
Albert Sheridan

Inventor:
Tighlman H. Boyer
By H. H. Bliss Attorney

UNITED STATES PATENT OFFICE.

TILGHMAN H. BOYER, OF ALLENTOWN, PENNSYLVANIA.

FILTER.

SPECIFICATION forming part of Letters Patent No. 657,851, dated September 11, 1900.

Application filed March 30, 1900. Serial No. 10,799. (No model.)

*To all whom it may concern:*

Be it known that I, TILGHMAN H. BOYER, a citizen of the United States, residing at Allentown, in the county of Lehigh and State of Pennsylvania, have invented certain new and useful Improvements in Filters, of which the following is a specification, reference being had therein to the accompanying drawings.

Figure 1:
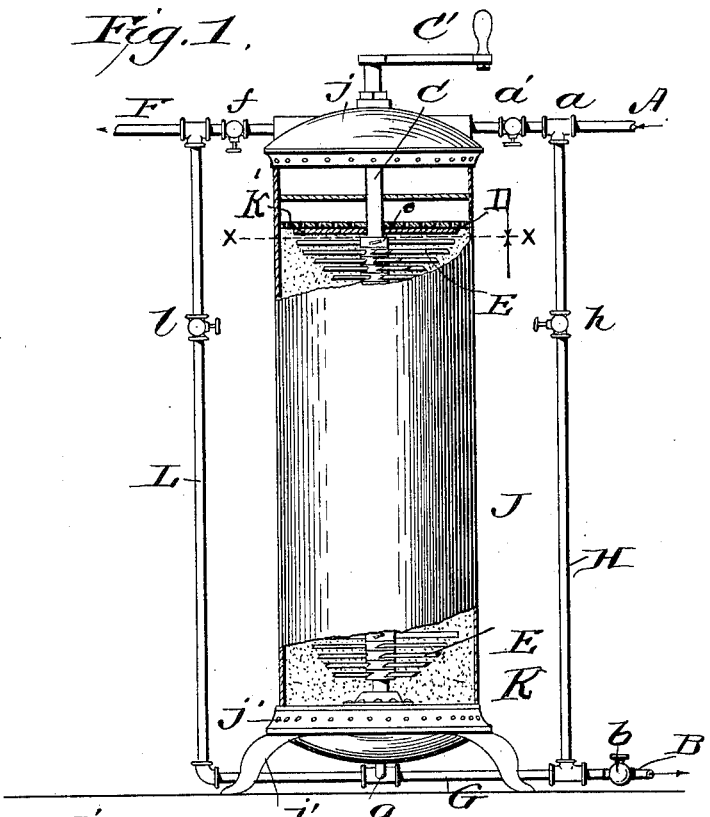
Figure 2:
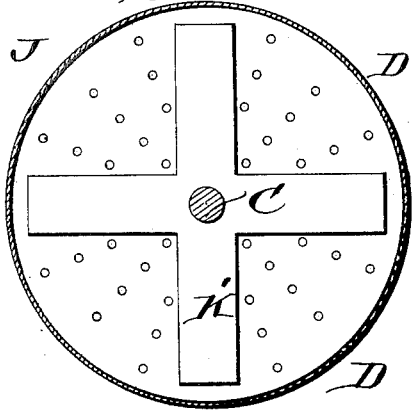
Figure 3:
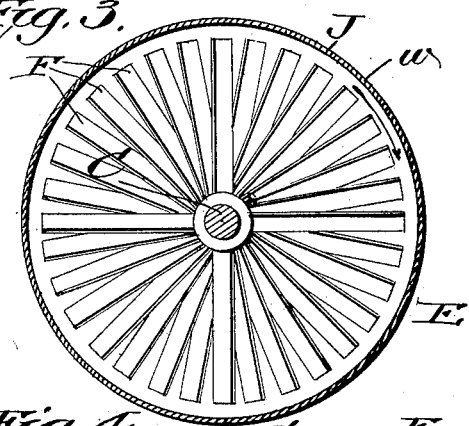

Figure 1 is a view, partly in side elevation and partly in section, of a filtering apparatus embodying my improvements. Fig. 2 is a cross-section on the line $xx$, Fig. 1. Fig. 3 is a cross-section on the line $y\ y$ of Fig. 1.

The construction illustrated is represented as having a main vessel or receptacle J, which may be of any suitable form, but is preferably substantially such as shown, being cylindrical and at the bottom fitted to a stand J' with legs $j'$, which hold the main body part J a suitable distance from the floor. At the top there is a cap or closing device $j$, formed with parts to be described. Water is admitted generally through the supply-main A $a$, which communicates with the closed upper end or cap part $j$ of the filter proper, there being at $a'$ a valve or stop-cock which can be opened or closed at will. The water thus admitted passes downward through the body part J of the filter and is withdrawn through the duct $g$ and the pipe G, it escaping at B or being carried therefrom to any suitable point. Water can be also passed through the vessel J in the opposite direction, as follows:

H is a branch pipe communicating with the supply-duct at A and extending therefrom down to the pipe G. It is provided with a valve or stop-cock $h$, and when this is opened and the cock at $a'$ is closed the water will be delivered to the bottom of the filter vessel J and after rising through the latter will escape at the top through the pipe at F, the latter being provided with a valve or stop-cock $f$.

K indicates the filtering material, which may be formed of any suitable or well-known substance, such as granulated charcoal or the like. It acts in the now well-known way to collect from the water that is passing downward through the vessel the impurities which it contains, the latter remaining in the vessel, adhering to the particles of the filtrant and the water passing on and escaping in a purified condition.

As is well known, the mass of filtering material soon becomes impervious to the water, because of the interstices among the particles of the filtrant becoming clogged with the coagulated materials that have been abstracted from the water. When this condition of the filtering material is reached, it is necessary to cleanse it or to withdraw it entirely from the vessel and substitute a new charge. Various devices have been suggested for effecting the cleansing of the filtering material while it remains in the vessel, and thus making it indefinitely efficient for its purpose. Some of the mechanisms which have been suggested for this purpose have included devices for breaking up and agitating the mass of filtering material; but serious difficulty has been incident to all the mechanisms for this purpose within my knowledge, and particularly this that after the filtering mass has become broken up and subjected to the action of a reverse current of water large quantities of the small particles are carried off by the water, and after a few cleansing operations the filtering mass becomes so reduced that it is incapable of fulfilling its purpose.

The object of the present invention is to provide means for effecting a thorough disintegration of the packed and coagulated filtering mass and at the same time preventing the carrying off of any of the particles thereof by the upward-flowing current of water. These ends are accomplished by devices which not only cut the mass horizontally, but also act to move the several parts thereof vertically by pushing them up and thrusting them down, so as to effectually reduce the entire body of filtrant again to a mass of granules and by combining therewith retaining devices which prevent the particles of filtrant from passing off in the water.

Figure 4:
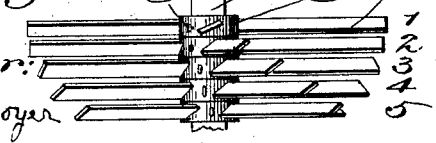

C is a vertical shaft mounted centrally within the vessel J and provided with crank C' at its upper end. It carries a number of spirally-arranged blades or stirring, agitating, and lifting arms E E. These are preferably constructed and arranged as shown. A collar $e$ is cast or provided with a series of blades projecting radially therefrom and uniformly disposed around the center. As shown, there are four of these with each collar, ninety degrees apart. Each is situated with its plane inclined to the plane of the horizon, the inclinations being all similar as to the center. In other words, each blade and its set of blades is in the nature of a section of a propeller or a screw having four threads or helices. By referring to Figs. 3 and 4 it will be seen that the sections are so arranged that their corresponding blades or arms are in different vertical planes, section No. 2 having its blades somewhat behind those of section No. 1, and No. 3 having its blades somewhat behind those of No. 2, and so on. Such arrangement of the sections relatively to each other can be readily accomplished by shifting the collars $a$ and setting them as desired by the screws $a'$. When the shaft C is rotated by the crank C', these blades or arms cut through the filtering mass, dividing it horizontally and causing a vertical movement of the parts thereof. That part of the mass which is near the axis will be elevated, because of the screw-conveyer-like arrangement of the blades. The stream of material that is in this way elevated at or near the center is stopped by a diaphragm or partition at D and is there directed outward. The blades E are at their outer ends so arranged as to leave free passage-ways downward, as illustrated in Fig. 3. These permit the material to descend on lines near the cylinder-wall. In this way a most thorough and efficient agitating of the mass is caused. Prior to this cutting and agitating the mass of filtering material the water is caused to pass in the reverse direction through the vessel, the valve at $a'$ being closed and those at $h$ and $f$ being opened. The water thus introduced and rising upward through the vessel loosens, dissolves, and carries off the foreign materials which have been deposited upon the filter mass, and after a short period the agitated and washed particles of carbon or other granules assume their initial condition of purity and the apparatus is again ready for delivering a stream of water. The agitating, however, of the mass of filtrant at the time that the current of water is passing through under more or less pressure produces a liability for particles or small masses of the charcoal or other filtrant to be lifted and carried off with the water. This is obviated by a holding device or retaining-diaphragm at D, which is here shown as a perforated or reticulated sheet placed across the interior of the filter-chamber. The apertures or passage-ways through these are liable to be clogged and also liable to permit more or less of the fine particles to escape upward. To prevent the latter and to keep the retaining-partition clear, I employ the device shown at K, this consisting of one or several rotary arms secured to the shaft C and placed in close proximity to the retaining-partition. These arms assist in carrying outward the rising filtering particles and they remove any sediment deposited on the partition and prevent the upward escape of the carbon. After the filtering mass has been thus broken up, disintegrated, and cleansed by the upward flowing stream of water there will be of course a charge of unfiltered water in the vessel after the valves $h$ and $f$ are closed. To discharge this unfiltered water and prevent it from passing through the supply-pipe B, I employ a pipe L, having a stopcock or valve at $l$. After the cleansing operation has been completed and after the valves $f$ and $h$ have been closed the valves at $a'$ and $l$ are opened, that at $b$ still remaining closed also, and thereupon the water can pass again in at the top of the filtering-chamber and out at the bottom through the pipes G and L to the waste-pipe F, and this operation is kept up until there is a complete discharge from the cylinder of the quantity of water which was left therein after the previous cleansing operation, in which it passed in an unfiltered condition into and up from the bottom. After this unfiltered water is effectually discharged the valve $l$ is again closed and the valve at $b$ opened, and a new stream of filtered water is obtainable.

I am aware of the fact that in filters as heretofore constructed or proposed numerous plans have been suggested for agitating the filter-bed by means of rotating arms, and, further, that in one or two instances it has been proposed to provide a longitudinally-arranged shaft with two or three isolated blades or arms, vertically remote from each other and each inclined somewhat to the horizontal plane; but I regard myself as being the first to provide what I have termed a "conveyer," with its parts so arranged that it can compel the filtering material to travel in a substantially-continuous stream along some lines and at the same time permit it to move in the opposite direction along passage-ways provided therefor. In no earlier construction within my knowledge has use been made of what can be properly considered as a positively-acting conveyer adapted to keep the particles of material in continuous motion. The blades herein are so arranged upon the same lines longitudinally of the vessel that they may be regarded as forming the parts of a substantially-continuous spiral conveyer, the material passing immediately from one of the parts to the next and being thus kept continuously not only in agitation, but in movement longitudinally.

Of course there can be numerous modifications with respect to details so long as the mechanism embodies the essential features of the invention.

What I claim is—

1. In a filter of the class described, the combination with a filtering vessel containing a mass of granulated filtering material, of the longitudinally-arranged spiral conveyer arranged to advance the filtering material longitudinally of the vessel, a stop for the material, and passage-ways longitudinally of the vessel whereby the said material can return in a direction opposite to that of its advance by the conveyer, substantially as set forth.

2. In a filter of the class described, the combination with a filtering vessel containing a mass of granulated filtering material, of a spiral conveyer formed of a series of blades, said series extending continuously around the axis, and each blade having its inner end in or near the same axial plane as the ends of the adjacent blades, and having its outer end in an axial plane other than those of the outer ends of the adjacent blades, each said blade diverging outwardly from those in adjacent axial planes, leaving passages on lines between its side edges and the side edges of the blades next adjacent whereby the filtering material can be moved longitudinally of the vessel, and allowed to move in the opposite direction, longitudinally, substantially as set forth.

3. In a filter of the class described, the combination with the filtering vessel containing a mass of filtering material, of the spiral conveyer formed of a series of relatively-narrow blades overlapping each other successively in axial planes at their inner ends, and separated from each other axially at their outer ends, substantially as set forth.

4. In a filter of the class described, the combination with the filtering vessel containing a mass of granulated filtering material, of a longitudinally-arranged upwardly-acting spiral conveyer having a series of blades whose outer ends are separated from each other, and are arranged to provide passage-ways downward for the material and a guide or stop for the material at the upper end of the vessel, substantially as set forth.

5. In a filter of the class described, the combination with the filtering vessel containing a mass of granulated filtering material, of a longitudinally-arranged spiral conveyer formed of a series of relatively-narrow arms or bars in different planes transverse of the axis of the conveyer, and separated at their outer ends, substantially as set forth.

6. In a filter of the class described, the combination with a filtering vessel containing a mass of granulated filtering material, of the longitudinally-arranged shaft in the vessel, the series of collars or arm-supports and a series of spirally-arranged agitating and conveying arms respectively secured to the said collars or supports, substantially as set forth.

7. In a filter, the combination with a filtering vessel adapted to contain a mass of granulated filtering material, of a mechanism for positively engaging with and agitating the granulated material from the axis of the vessel to the circumference thereof and forcing it in a continuous stream in one direction through the vessel, passage-ways permitting the passage of the material in the opposite direction, and means for guiding the material from the lines along which it is forced to said passage-ways, substantially as set forth.

8. In a filter, the combination with a filtering vessel containing a mass of filtering material, of an agitator having a series of arms rotating around a common axis and arranged to form a substantially-continuous spiral or helix relative to axial planes and separated from each other in transverse planes, whereby the material is not only agitated but continuously advances longitudinally, substantially as set forth.

9. In a filter, the combination with a filtering vessel adapted to contain a mass of granulated filtering material of mechanism extending from the axis to the circumference of the said mass and positively engaging with and agitating it throughout and simultaneously moving it in a substantially-continuous stream on longitudinal lines of the vessel, and means supplemental to said mechanism for engaging with the material and positively moving it transversely of the vessel, substantially as set forth.

10. In a filter, the combination with a filtering vessel adapted to contain a mass of granulated filtering material, of a perforated partition or retaining device D, mechanism for causing the filtering material to move toward the said partition, and a rotary arm or arms K adjacent to the said partition or retainer, and in the path of the filtering material, substantially as set forth.

11. In a filter, the combination with a filtering vessel adapted to contain a mass of filtering material, of a rotary agitator-shaft, the series of laterally-projecting arms having their surfaces inclined to planes transverse of the shaft and the blade carriers or hubs adapted to be secured in either of several positions around the shaft substantially as set forth.

In testimony whereof I affix my signature in presence of two witnesses.

TILGHMAN H. BOYER.

Witnesses:
W. H. RODGERS,
C. R. JAMES.